US012639869B2

(12) United States Patent
Qi

(10) Patent No.: US 12,639,869 B2
(45) Date of Patent: May 26, 2026

(54) METHOD, APPARATUS, DEVICE AND MEDIUM FOR PRESENTING MULTIMEDIA CONTENT

(71) Applicant: Beijing Zitiao Network Technology Co., Ltd., Beijing (CN)

(72) Inventor: Junyuan Qi, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/054,318

(22) Filed: Feb. 14, 2025

(65) Prior Publication Data

US 2026/0004488 A1 Jan. 1, 2026

Related U.S. Application Data

(63) Continuation of application No. PCT/CN2024/101740, filed on Jun. 26, 2024.

(51) Int. Cl.
*G06F 9/445* (2018.01)
*G06T 11/60* (2006.01)

(52) U.S. Cl.
CPC .......... *G06T 11/60* (2013.01); *G06F 9/44526* (2013.01); *G06T 2200/24* (2013.01)

(58) Field of Classification Search
CPC .. G06T 11/60; G06T 2200/24; G06F 9/44526
See application file for complete search history.

(56) References Cited

U.S. PATENT DOCUMENTS

| | | | | |
|---|---|---|---|---|
| 9,454,531 | B1* | 9/2016 | Fisher | G06F 16/739 |
| 2014/0282014 | A1* | 9/2014 | Lee | G06F 3/048 |
| | | | | 715/733 |
| 2017/0308516 | A1* | 10/2017 | Steplyk | H04L 51/08 |
| 2017/0315966 | A1* | 11/2017 | Iyer | G06F 40/106 |

(Continued)

FOREIGN PATENT DOCUMENTS

| | | |
|---|---|---|
| CN | 110020293 A | 7/2019 |
| CN | 111241793 A | 6/2020 |
| CN | 117271807 A | 12/2023 |

OTHER PUBLICATIONS

ISA China National Intellectual Property Administration, International Search Report Issued in Application No. PCT/CN2024/101740, Nov. 29, 2024, 6 pages.

(Continued)

*Primary Examiner* — Anil K Bhargava
(74) *Attorney, Agent, or Firm* — Alleman Hall LLP

(57) ABSTRACT

Methods, apparatuses, devices, and media for presenting multimedia content are provided. In one approach, a content presentation format matching input information is determined in response to the input information of a user. The multimedia content is generated based on the input information and the content presentation format, and a file format of the multimedia content matches the content presentation format. The multimedia content is presented. According to example embodiments in the disclosure, a content presentation format may be determined according to the information input by the user, and corresponding multimedia content is generated. Further, the multimedia content may be presented in a suitable manner, such that the user may be facilitated to view and/or edit the generated multimedia content.

20 Claims, 7 Drawing Sheets

(56) References Cited

U.S. PATENT DOCUMENTS

| | | | |
|---|---|---|---|
| 2018/0367848 A1* | 12/2018 | Kumar | H04N 21/44226 |
| 2019/0362466 A1* | 11/2019 | Marchya | G06T 1/20 |
| 2021/0311595 A1* | 10/2021 | Boucher | G06F 3/041 |
| 2022/0035989 A1* | 2/2022 | Dotan-Cohen | H04L 51/18 |
| 2022/0229832 A1 | 7/2022 | Li et al. | |
| 2024/0220717 A1* | 7/2024 | Nagargoje | G06F 3/0482 |

OTHER PUBLICATIONS

European Patent Office, Extended European Search Report Issued in Application No. 24850227.0, Sep. 10, 2025, Germany, 10 pages.

* cited by examiner

100

110
PROCESSING
SYSTEM

120 INPUT
INFORMATION

PLEASE COMPOSE
AN EMAIL...

130 MULTIMEDIA
CONTENT

HI,ALL,...

...

140

SEND A MESSAGE...

200

230
INPUT
INFORMATION

210
CONTENT
PRESENTATION
FORMAT

240
MULTIMEDIA
CONTENT

220
FILE FORMAT

300C

| | | 340 | 342 | 344 |
|---|---|---|

| | 340 | 342 | 344 |
|---|---|---|
| TEXT | APPLICATION 1 | ROOT\...\APP_1 |
| | ... | ... |
| | APPLICATION K | HTTP://...URL_K |
| ... | ... | ... |
| IMAGE | APPLICATION M | ROOT\...\APP_M |
| | ... | ... |
| | APPLICATION N | HTTP://...URL_N |

400

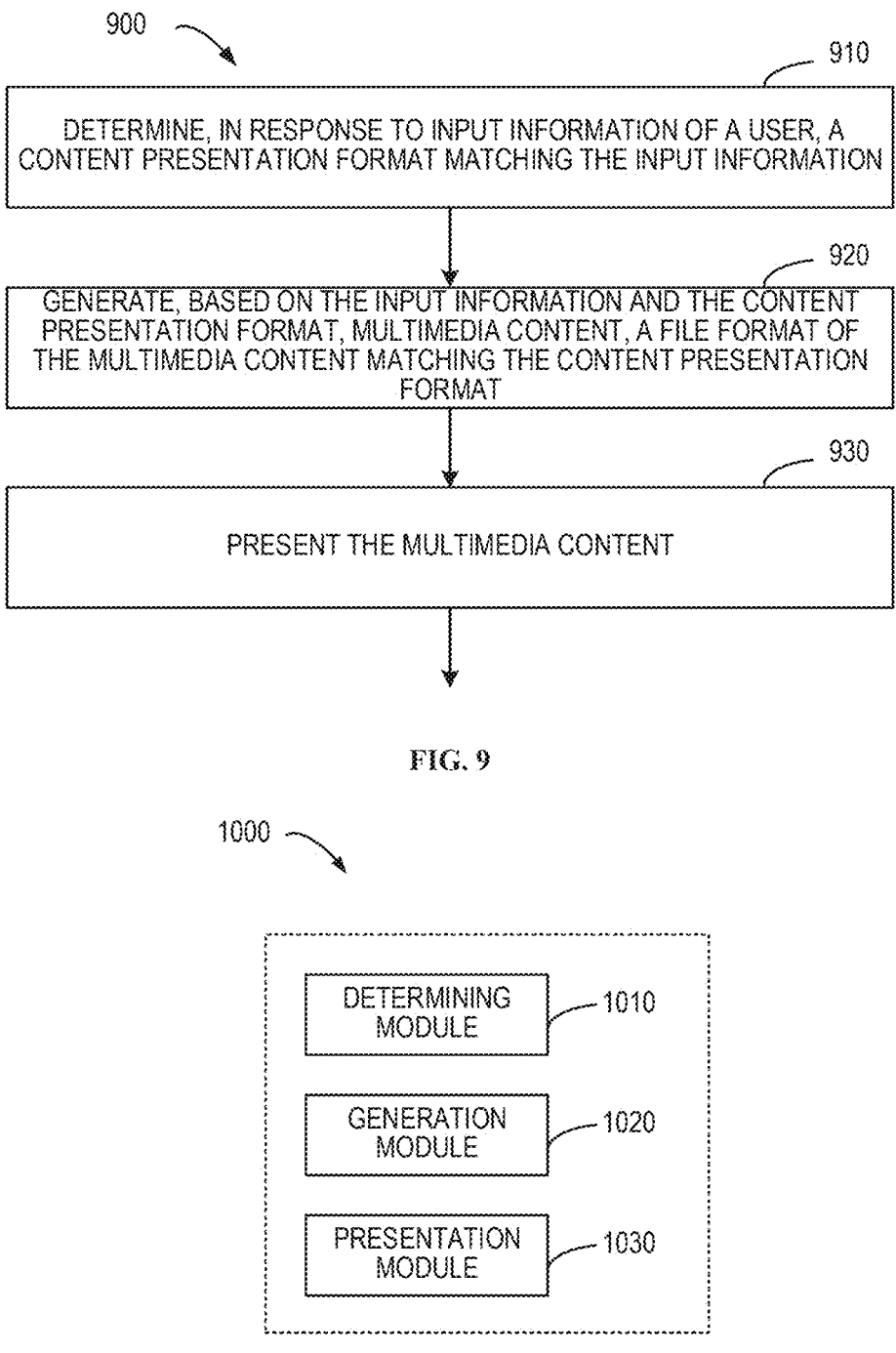

900

910

DETERMINE, IN RESPONSE TO INPUT INFORMATION OF A USER, A CONTENT PRESENTATION FORMAT MATCHING THE INPUT INFORMATION

920

GENERATE, BASED ON THE INPUT INFORMATION AND THE CONTENT PRESENTATION FORMAT, MULTIMEDIA CONTENT, A FILE FORMAT OF THE MULTIMEDIA CONTENT MATCHING THE CONTENT PRESENTATION FORMAT

930

PRESENT THE MULTIMEDIA CONTENT

DETERMINING MODULE — 1010

GENERATION MODULE — 1020

PRESENTATION MODULE — 1030

FIG. 10

METHOD, APPARATUS, DEVICE AND MEDIUM FOR PRESENTING MULTIMEDIA CONTENT

CROSS-REFERENCE TO RELATED APPLICATION

This application is a continuation of International Patent Application No. PCT/CN2024/101740, filed on Jun. 26, 2024, which is incorporated herein by reference in its entirety.

FIELD

Example embodiments in the disclosure generally relate to the field of computers, and in particular, to methods, apparatuses, devices, and computer-readable storage media for presenting multimedia content.

BACKGROUND

With the rapid development of computer technologies, processing systems may provide a variety of services to users. For example, a processing system may obtain input information from a user and provide the corresponding multimedia content based on the input information. However, the user may not be able to directly use the multimedia content but need to perform further operations on the multimedia content. At this point, it is desirable that the multimedia content may be determined and presented in a more effective manner for the user to perform subsequent operations.

SUMMARY

In a first aspect in the disclosure, a method for presenting multimedia content is provided. In the method, in response to input information of a user, a content presentation format matching the input information is determined. The multimedia content is generated based on the input information and the content presentation format, and a file format of the multimedia content matches the content presentation format. The multimedia content is presented.

In a second aspect in the disclosure, an apparatus for presenting multimedia content is provided. The device includes a determination module, configured to determine, in response to input information of a user, a content presentation format matching the input information; a generation module, configured to generate multimedia content based on the input information and the content presentation format, a file format of the multimedia content matches the content presentation format; and a presentation module, configured to present the multimedia content.

In a third aspect in the disclosure, an electronic device is provided. The electronic device includes: at least one processing unit; and at least one memory coupled to the at least one processing unit and storing instructions for execution by the at least one processing unit, the instructions, when executed by the at least one processing unit, causing the electronic device to perform the method according to the first aspect in the disclosure.

In a fourth aspect in the disclosure, there is provided a computer-readable storage medium having stored thereon a computer program which, when executed by a processor, causes the processor to implement the method according to the first aspect in the disclosure.

In a fifth aspect in the disclosure, there is provided a computer program product, including a computer program, where the computer program, when executed by a processor, implements the method according to the first aspect in the disclosure.

It should be understood that the content described in this disclosure is not intended to limit key features or important features of embodiments in the disclosure, nor is it intended to limit the scope in the disclosure. Other features in the disclosure will become readily understood from the following description.

BRIEF DESCRIPTION OF DRAWINGS

The above and other features, advantages, and aspects of the various embodiments in the disclosure will become more apparent from the following detailed description taken in conjunction with the accompanying drawings. In the drawings, the same or similar reference numbers refer to the same or similar elements, where:

FIG. 9 shows a flowchart of a method for presenting multimedia content according to some embodiments in the disclosure;

FIG. 10 shows a block diagram of an apparatus for presenting multimedia content according to some embodiments in the disclosure.

DETAILED DESCRIPTION

Figure 1:
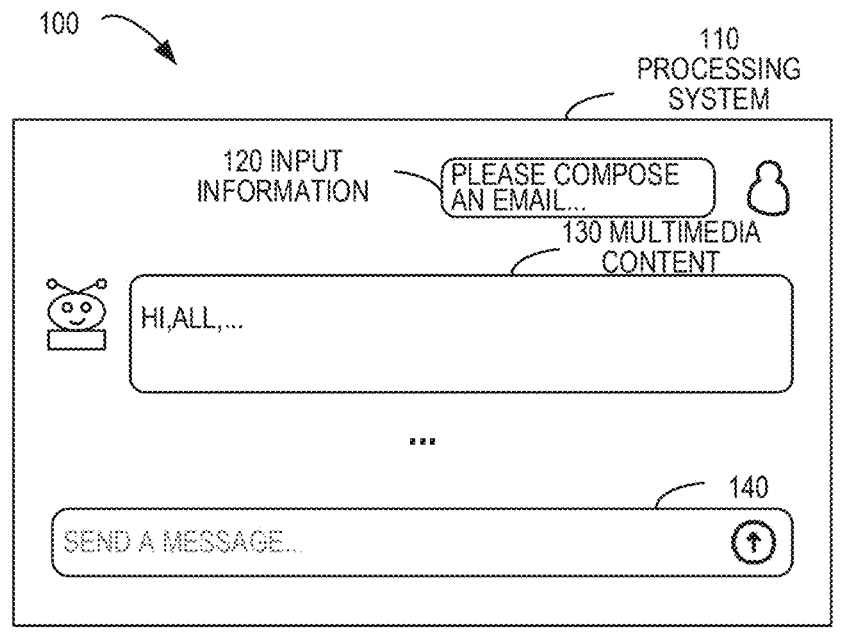
FIG. 1 illustrates a block diagram of an application environment according to an example embodiment in the disclosure.

Embodiments in the disclosure will be described in more detail below with reference to the accompanying drawings. While certain embodiments in the disclosure are shown in the accompanying drawings, it should be understood that the disclosure may be implemented in various forms and should not be construed as limited to the embodiments set forth herein, but rather, these embodiments are provided for a more thorough and complete understanding of the disclosure. It should be understood that the drawings and embodiments in the disclosure are for illustrative purposes only and are not intended to limit the scope of the disclosure.

In the description of embodiments in the disclosure, the terms "include", and similar terms should be understood to include "including but not limited to". The term "based on" should be understood as "based at least in part on". The terms "one embodiment" or "the embodiment" should be understood as "at least one embodiment". The term "some embodiments" should be understood as "at least some embodiments". Other explicit and implicit definitions may also be included below. As used herein, the term "model" may represent an association relationship between various data. For example, the association relationship may be obtained based on various technical solutions currently known and/or to be developed in the future.

It may be understood that the data involved in the technical solution (including but not limited to the data itself, the acquisition or use of the data) should follow the requirements of the corresponding laws and regulations and related regulations.

It can be understood that, before the technical solutions disclosed in the embodiments in the disclosure are used, the types of personal information related to the disclosure, the usage scope, the usage scenario and the like should be notified to the user in an appropriate manner according to the relevant laws and regulations, and the authorization of the user is obtained.

For example, in response to receiving an active request from a user, prompt information is sent to the user to explicitly prompt the user that the requested operation will need to acquire and use the personal information of the user. Therefore, the user can autonomously select whether to provide personal information to software or hardware executing the operation of the technical solution in the disclosure according to the prompt information.

As an optional but non-limiting embodiment, in response to receiving an active request of the user, a manner of sending prompt information to the user may be, for example, a pop-up window, and prompt information may be presented in a text manner in the pop-up window. In addition, the pop-up window may further carry a selection control for the user to select "agree" or "not agree" to provide personal information to the electronic device.

It may be understood that the foregoing notification and obtaining a user authorization process is merely illustrative, and does not constitute a limitation on embodiments in the disclosure, and other manners of meeting related laws and regulations may also be applied to embodiments in the disclosure.

The term "responsive to" as used herein means a state in which a respective event occurs or condition is satisfied. It will be appreciated that the timing of execution of a subsequent action performed in response to the event or condition is not necessarily strongly correlated with the time at which the event occurs, or the condition is satisfied. For example, in some cases, subsequent actions may be performed immediately when an event occurs or a condition holds; while in other cases, subsequent actions may be performed after a period of time elapses after an event occurs or a condition is satisfied.

Example Environment

Processing systems may provide a variety of services to users. For example, a processing system may obtain input information from the user and provide corresponding multimedia content based on the input information. FIG. 1 is a block diagram 100 of an application environment according to some embodiments in the disclosure. As shown in FIG. 1, the processing system 110 may perform a variety of tasks. A user may input a desired task in the input box 140 and submit input information. For example, the processing system 110 may receive the input information 120 and generate corresponding multimedia content 130.

Here, the processing system 110 may include, for example, a query system and/or a generative system implemented based on a machine learning model. The user may construct a prompt word as the input information 120 to obtain a corresponding response from the processing system 110. Assuming that the user wants to compose an email, and the user may input "Please compose an email . . . ", at this point, the multimedia content 130 may include the content of the corresponding email. However, at this point, the user has to manually open the email application and copy the multimedia content 130 into the email application to perform further editing. At this point, it is desirable that the multimedia content may be determined and presented in a more efficient manner for the user to perform subsequent operations.

Summary of Presenting Multimedia Content

Figure 2:
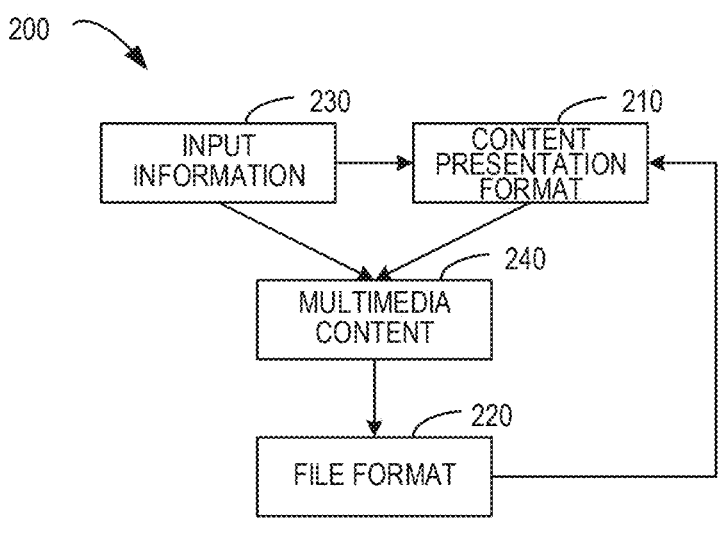
FIG. 2 illustrates a block diagram for presenting multimedia content according to some embodiments in the disclosure.

To at least partially address the deficiencies in the prior art, according to an example embodiment in the disclosure, a method for presenting multimedia content is provided. Referring to FIG. 2, an overview of an example embodiment in the disclosure is described, and FIG. 2 illustrates a block diagram 200 for presenting multimedia content according to some embodiments in the disclosure. As shown in FIG. 2, in response to user input information 230, a content presentation format 210 that matches the input information 230 may be determined. The multimedia content 240 is generated based on the input information 230 and the content presentation format 210, and the file format 220 of the multimedia content 240 matches the content presentation format 210. Further, the multimedia content 240 may be presented.

According to some embodiments in the disclosure, the content presentation format may include, but is not limited to, a text format, an image format, an audio format, a video format, or a rich media format including data in different formats, and so on. The multimedia content may be a format that supports browsing and/or editing by one or more applications. There may be a correspondence between the content presentation format and the file format, for example, a text format may correspond to multiple file formats, such as ".txt" format, ".doc" format, etc.; an image format may correspond to multiple file formats, such as ".jpg" format, ".bmp" format, etc.; a rich media format may correspond to multiple file formats, e.g., ".pdf" format, ".html" format, etc.

According to example embodiments in the disclosure, a content presentation format may be determined according to the information input by the user, and corresponding multimedia content is generated. Further, the multimedia content may be presented in a suitable manner, such that the user may be facilitated to view and/or edit the generated multimedia content. In this manner, the complexity of manual operations of the user can be reduced, thereby improving the efficiency of data processing.

Detailed Process for Presenting Multimedia Content

The overview according to some embodiments in the disclosure has been described, and more details will be provided below. According to some embodiments in the disclosure, generating the multimedia content may include generating a set of multimedia elements matching the input information, the multimedia content including the set of multimedia elements, and a layout style of the set of multimedia elements determined based on the input information and the content presentation format.

Figure 3A:
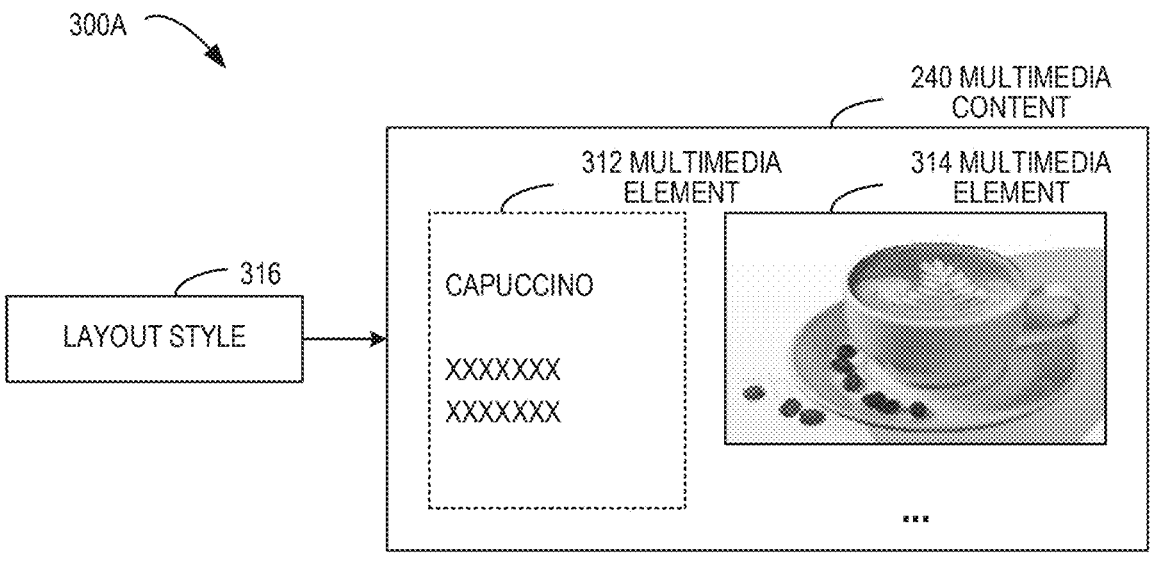
FIG. 3A illustrates a block diagram of multimedia content according to some embodiments in the disclosure.

Specifically, here, the input information may be a prompt word input to the processing system (e.g., implemented based on a machine learning model), and the processing system may generate the set of multimedia elements matching the input information. Further details are described with reference to FIG. 3A, which illustrates a block diagram 300A of multimedia content according to some embodiments in the disclosure. As shown in FIG. 3A, the generated multimedia elements 312, . . . , 314 arranged in a layout style 316 may be generated directly by the processing system. Alternatively and/or additionally, the multimedia elements 312, . . . , 314 and the layout style 316 may be generated by the processing system, respectively, and the multimedia elements 312, . . . , 314 may be further arranged in accordance with the layout style 316 in order to generate the multimedia content 240. Alternatively and/or additionally, the multimedia elements 312, . . . , 314 may be generated by the processing system, respectively, various multimedia elements may be presented, and the user may arrange the respective multimedia elements in a customized layout style in order to generate the multimedia content that more conforms to his/her needs.

According to some embodiments in the disclosure, in the process of generating the multimedia content, the user may be provided with a plurality pieces of prompt information respectively corresponding to a plurality of candidate applications matching the content presentation format; and in response to receiving an interaction request of the user for the prompt information in the plurality pieces of prompt information, a candidate application matching the prompt information is selected from the plurality of candidate applications; and the multimedia content is generated based on the at least one file format supported by the candidate application.

Specifically, assuming that the content presentation format is an image format, and an application A, an application B, and an application C may all present and edit data objects in the image format. The user may be provided with prompt information A, prompt information B, and prompt information C corresponding to the respective applications. The multimedia content in the image format that the user desires to present and/or edit may be determined based on the user's selection of the prompt information. Assuming that the user selects the prompt information A, and the application A corresponding to the prompt information A may support the ".jpg" format and the ".bmp" format, at this point, an image in the ".jpg" format and/or the ".bmp" format may be generated. With example embodiments in the disclosure, suitable multimedia content may be generated based on user requirements for subsequent operations by the user.

According to some embodiments in the disclosure, in the process of presenting the multimedia content, an application for presenting the multimedia content may be determined, and the multimedia content is presented in the application. In particular, a user-specified application may be selected, and/or an application that the user has frequently used in the past may be selected. Specifically, to determine the application for presenting the multimedia content, in response to receiving the user input specifying the application, the application may be determined based on the user input. For example, the user may be asked: "What application you wish to use to open the multimedia content?" In this manner, applications that more match the user needs may be selected.

Alternatively and/or additionally, in determining the application for presenting the multimedia content, an association relationship between the file format and the plurality of applications may be determined based on a usage history of the user using the plurality of applications; and the application is selected from the plurality of applications based on the association relationship. More information is described with reference to FIG. 3B, which illustrates a block diagram 300B for selecting an application according to some embodiments in the disclosure.

Figure 3B:
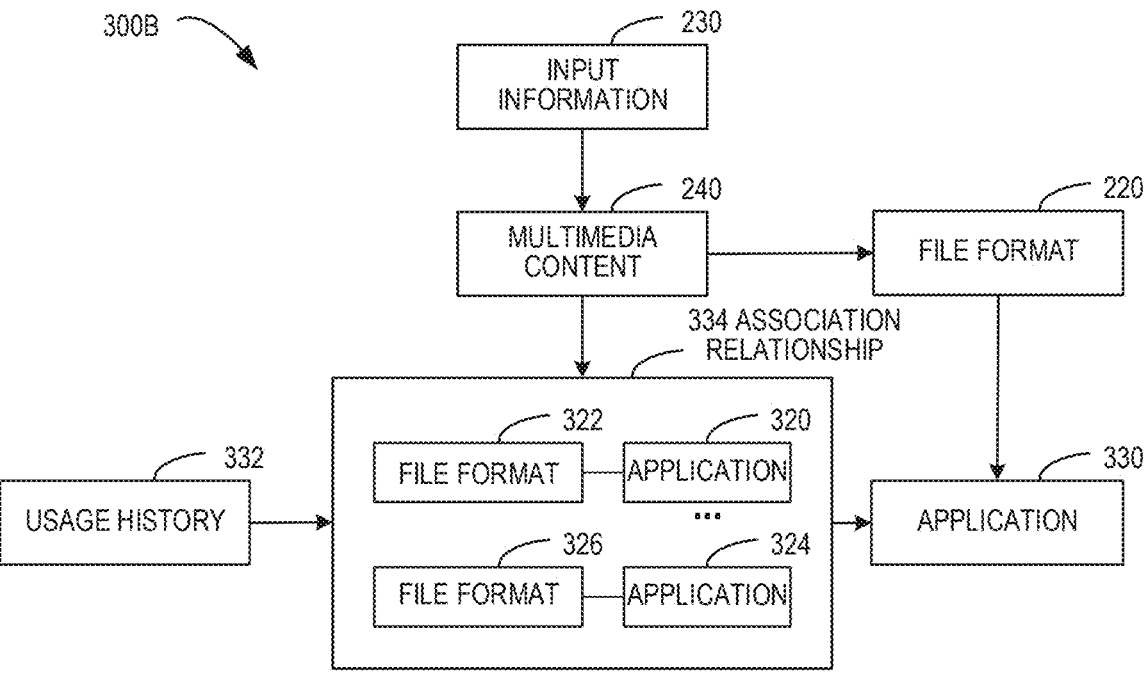
FIG. 3B illustrates a block diagram for selecting an application according to some embodiments in the disclosure.

As shown in FIG. 3B, the association relationship 334 may be determined based on the usage history 332 of a plurality of applications. The association relationship 334 may describe the association relationship between a plurality of file formats and the plurality of applications corresponding to the plurality of file formats respectively. For example, the application 320 may be utilized to process data objects having file format 322, the application 324 may be utilized to process data objects having file format 326, and so on. Further, in response to receiving the input information 230 from the user, the multimedia content 240 that matches the input information 230 may be obtained (e.g., the multimedia content is obtained from the processing system). The application 330 corresponding to the file format 220 of the multimedia content 240 may be determined from the plurality of applications based on the association relationship 334 and the multimedia content 240 may be presented with the application 330.

According to some embodiments in the disclosure, the usage history may indicate the plurality of applications used by the user during the processing of data objects of the plurality of file formats, and determining the association relationship includes: determining, for a file format of the plurality of file formats, an application corresponding to the file format from the plurality of applications based on a frequency of use of the plurality of applications. During the user's historical use, it may be recorded which application the user used to process data objects in a certain format, the frequency of use of each application may be determined, and then the association relationship between the applications and the file formats may be determined.

For example, a user may process a data object in text format using one or more text applications, a user may process a data object in text format using one or more image applications, and/or the like. It should be understood that the application herein may include an application installed locally on a client device of a user, or may include a network application accessed via a browser. In this manner, users may be supported to process data with a plurality of types of applications.

Figure 3C:
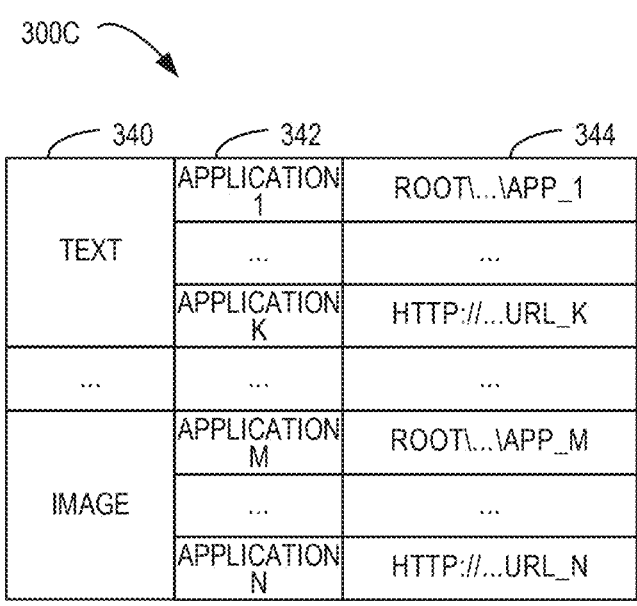
FIG. 3C illustrates a block diagram of an association relationship according to some embodiments in the disclosure.

Referring to FIG. 3C, an example of an association relationship is described, and FIG. 3C illustrates a block diagram 300C of an association relationship according to some embodiments in the disclosure. As shown, the column 340 may represent a file format, the column 342 may represent an application for processing data objects in a certain file format, and the column 344 may represent an access address for the application. For example, in the case of a local application, the access address may represent an address of an executable file under a predetermined directory of the client device; in the case of a web application, the access address may represent an address of a uniform resource locator (URL) accessed via a browser of the client device.

According to some embodiments in the disclosure, the user may update the association relationship. Specifically, in the process of determining the association relationship, in response to receiving an update request for the association relationship, the association relationship is updated based on the update request. For example, the user may add a new association relationship, edit an existing association relationship, and/or delete an existing association relationship from the association relationship. Specifically, the user may add relevant information about the application for the file format of "email" to FIG. 3C. For example, an email may be processed using the application P, and the webpage address of the application P may be specified, and so on. Alternatively and/or additionally, the user may use natural language to describe the association relationship. For example, the user may enter: "I usually use the application P to process email", etc. A priority may be assigned for each association relationship in order to determine the relevant application in a more accurate manner.

According to some embodiments in the disclosure, for a file format, the association relationship may specify a plurality of candidate applications. At this point, a certain application may be selected from the plurality of candidate applications. Specifically, in response to determining that the file format corresponds to a plurality of candidate applications based on the association relationship, an application supported by the client device is determined from the plurality of candidate applications, the method performed at the client device.

For example, assuming that the user specifies that text is processed using a local application 1 and a web application 2, while the client device is not installed with the local application 1. At this point, the URL of the web application 2 may be accessed and the web application 2 is utilized to open the multimedia content. Alternatively and/or additionally, the multimedia content may be presented preferentially using applications that are currently open. With example embodiments in the disclosure, user waiting time may be reduced, and users may be facilitated to further edit multimedia content in applications currently in use.

According to some embodiments in the disclosure, in the process of determining the application, in response to determining that the file format corresponds to a plurality of candidate applications based on the association relationship, prompt information with respect to the plurality of candidate applications may be provided. Further, in response to receiving a selection request for the prompt information, the application may be selected based on the selection request. With example embodiments in the disclosure, the multimedia content may be presented with applications more conform to user needs.

According to some embodiments in the disclosure, a usage scenario of the user may be further determined, and the application is selected based on the usage scenario. The input information may be analyzed to determine the usage scenario. Assuming the input information is: "Please compose an email, inviting the co-workers from the technology department to a meeting in the conference room A", at this point, the usage scenario may be determined as the "work email scenario" based on text analysis and/or by invoking the machine learning model in the processing system. A local email application that the user frequently sends and receives work emails may be selected. For another example, assuming the input information is: "Please compose an email, inviting friends A and B to watch a movie", at this point, the usage scenario may be determined as the "private email scenario" based on text analysis and/or by invoking the machine learning model in the processing system. A web email application that the frequently sends and receives personal emails may be selected.

According to some embodiments in the disclosure, the plurality of applications herein are web applications, and the method described above is implemented with a plug-in of a browser for accessing the web application, and the association relationship is stored in the plug-in. In this case, the plug-in may collect the user's usage history of using each webpage application to process data objects in various file formats, thereby supporting the determination of the association relationship in a simpler and effective manner.

According to some embodiments in the disclosure, the user may interact with a browser, e.g., enter input information in the browser, and view multimedia data presented in the browser. With example embodiments in the disclosure, a plurality of web applications may be invoked in the browser and the multimedia content may be presented in a more efficient manner.

Figure 4:
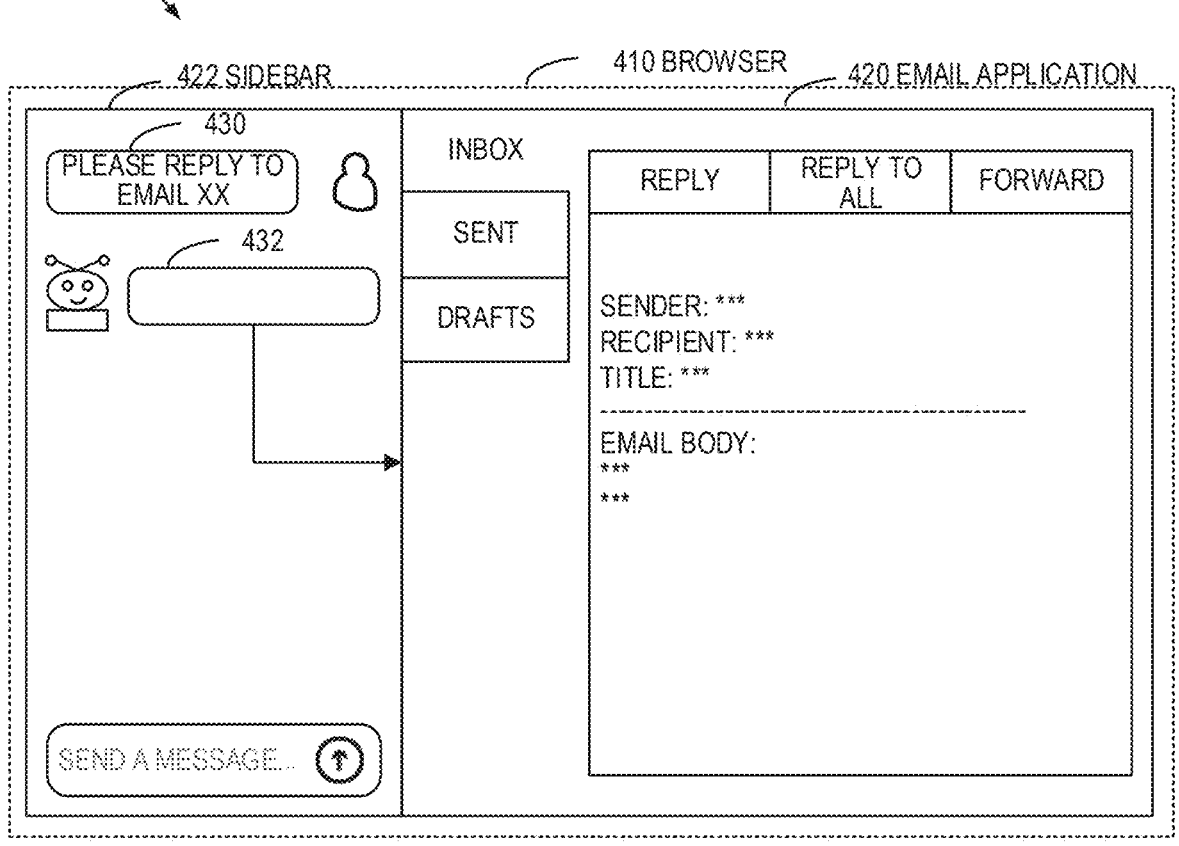
FIG. 4 illustrates a block diagram of presenting multimedia content in an email application, in accordance with some embodiments in the disclosure.

According to some embodiments in the disclosure, a plug-in may be utilized to present an interactive page with the processing system in a browser. For example, the interactive page may be presented in a sidebar of the browser, alternatively and/or additionally, the interactive page may be superimposed on the page of the browser in a floating manner. Referring to FIG. 4, more details regarding presenting the multimedia content are described, which illustrates a block diagram 400 of presenting the multimedia content in an email application in accordance with some embodiments in the disclosure. As shown in FIG. 4, the browser 410 may include a left portion and a right portion, the left portion may present the sidebar 422 to interact with the processing system, and the right portion may present a specific page of the web application accessed by the browser. Based on the URL accessed by the browser, an email application, a text application, a presentation application, a data table application, and the like may be presented separately.

According to some embodiments in the disclosure, in the process of presenting the multimedia content using the application, the multimedia content may be copied to a working space of the application, for the application to present the multimedia content. Specifically, the application may first be opened using the access address of the application, and then the multimedia content is copied to the target location associated with the input information in the workspace. According to some embodiments in the disclosure, a template position may be determined based on semantic recognition and/or with a machine learning model in the processing system.

Continuing with the example above, the user-entered input information 430 may represent "Please reply to email XX", and the processing system may provide the multimedia content 432 for that input information. Here, the multimedia content 432 is in an email format, so that the email application 420 may be directly opened, and further, the target location may be determined as the location of "reply to the email" from the input information 430. At this point, the multimedia content 432 may be inserted at the location in the email application 420 for replying to the email. Alternatively and/or additionally, assuming the input information 430 indicates "Please reply to all", and at this point, the target location may be determined as an input box for "reply to all". Assuming that the input information 430 indicates "Please forward the email," at this point, the target location may be determined as an input box for "forwarding". In this manner, the content of the reply to the email may be automatically entered at a desired location without requiring a complex operation of user replication/pasting. The user may further edit the email in the email application 420.

According to some embodiments in the disclosure, the input information may relate to a new file format that was not previously used. Here, the multimedia content is determined based on the response of the processing system to the input information, and the processing system may be used to determine which application to use to present the multimedia content. Specifically, in response to a failure in determining the application based on the association relationship, a candidate application corresponding to the file format of the multimedia content is determined by the processing system; and the multimedia content is presented using the candidate application.

Figure 5:
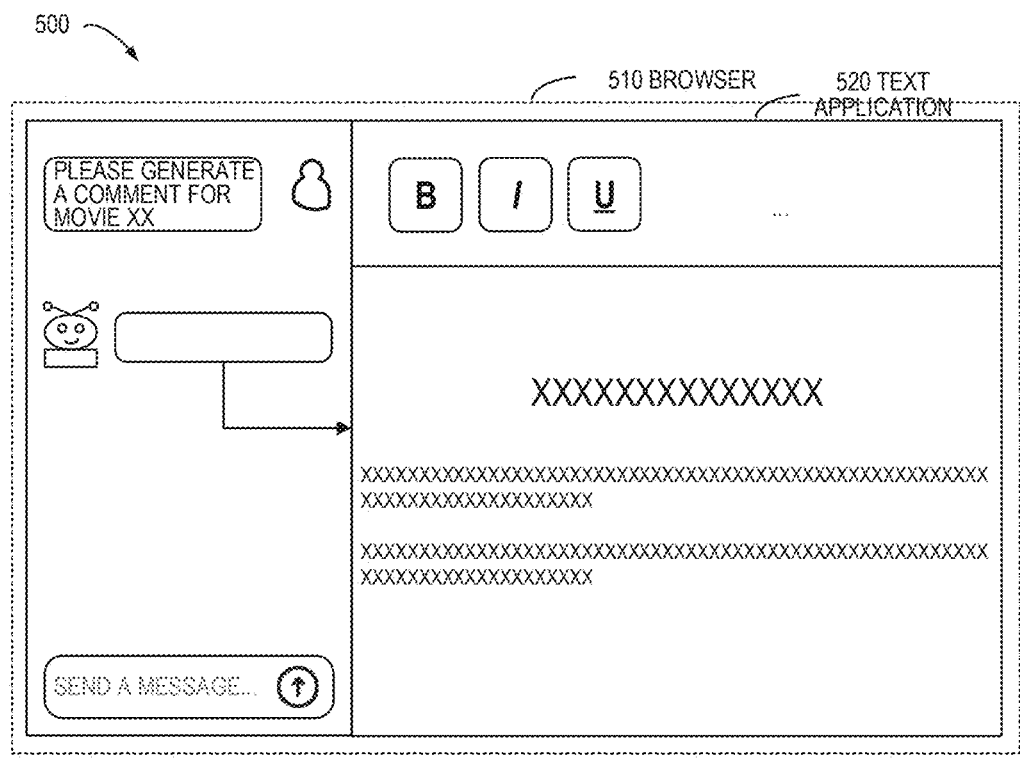
FIG. 5 illustrates a block diagram of presenting multimedia content in a text application, according to some embodiments in the disclosure.

FIG. 5 illustrates a block diagram 500 of presenting multimedia content in a text application, in accordance with some embodiments in the disclosure. Assuming the input information represents "Please generate a comment for movie XX", and the processing system generates a comment in a text format, the processing system may determine to present the multimedia content using the text application. Specifically, the text application 520 may be automatically opened in the browser 510 to present the generated comment. Alternatively and/or additionally, assuming the processing system generates comments in a rich media format (e.g., including text and images), an editing application supporting the rich media format may be automatically opened in the browser 510 to present the generated comment. The user may further edit the comment in the text application 520. With example embodiments in the disclosure, the powerful processing capabilities of the machine learning model in the processing system may be used to process new file formats that have not been processed before.

Figure 6:
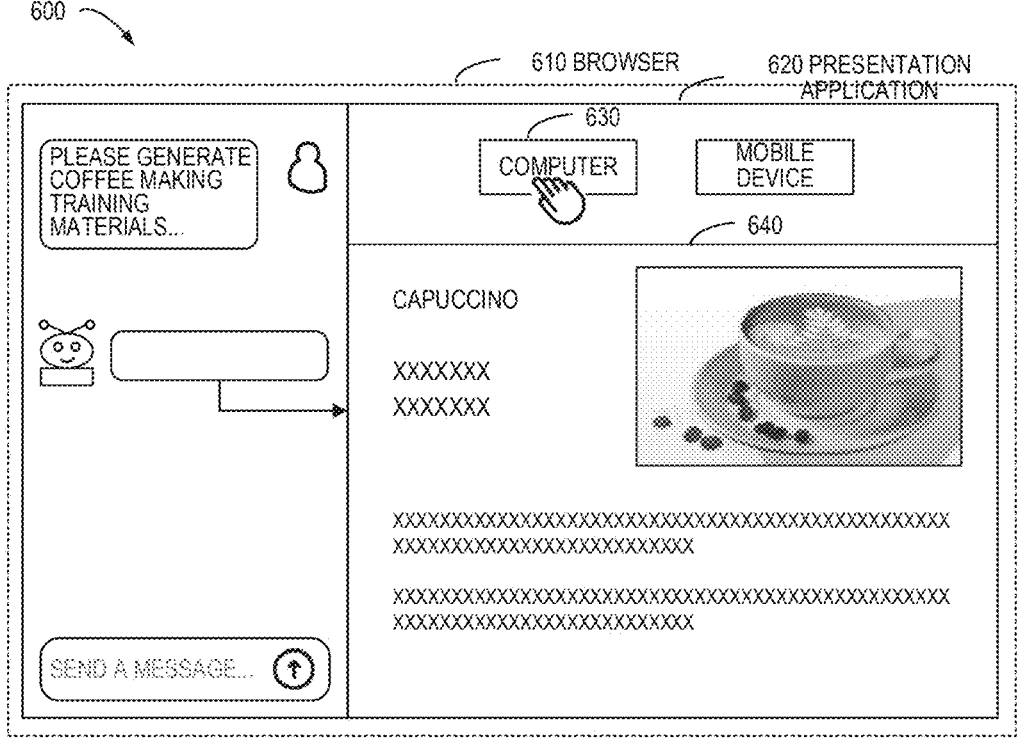
FIG. 6 illustrates a block diagram of presenting multimedia content in a presentation application according to some embodiments in the disclosure.

FIG. 6 illustrates a block diagram 600 of presenting multimedia content in a presentation application, in accordance with some embodiments in the disclosure. As shown in FIG. 6, assuming the input information indicates "Please generate coffee making training materials . . . ", the processing system may generate a document including data objects in the multimedia format. At this point, the presentation application 620 may be opened at the browser 610 to present the document. According to some embodiments in the disclosure, a corresponding document may be generated based on a user specified application scenario. Assuming a user interaction request for the page element 630 is received, it may be determined that the application scenario is a computer scenario, that is, the document is to be presented at a conventional computer device. At this point, the presentation 640 may be generated.

Figure 7:
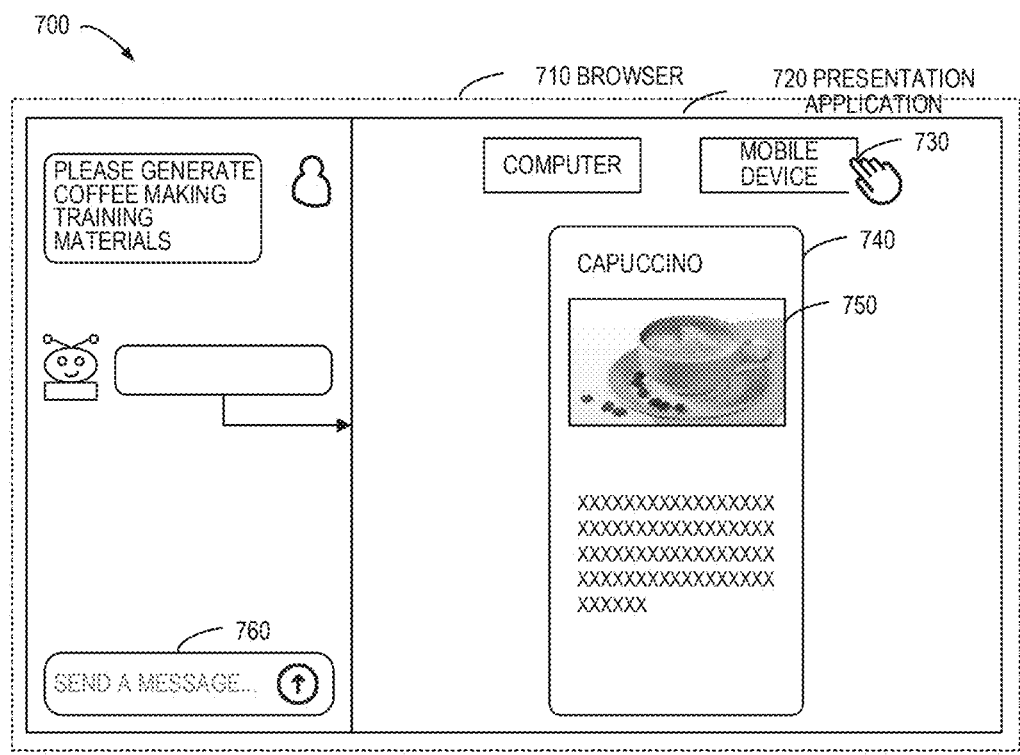
FIG. 7 illustrates a block diagram of presenting multimedia content in a presentation application according to some embodiments in the disclosure.

FIG. 7 illustrates a block diagram 700 of presenting multimedia content in a presentation application, in accordance with some embodiments in the disclosure. As shown in FIG. 7, assuming an interaction request of a user for a page element 730 is received, it may be determined that the application scenario is a mobile device, that is, the document is to be presented at a mobile device (for example, a mobile phone). At this point, the presentation 740 may be generated. With example embodiments in the disclosure, the multimedia content may be generated and presented in a user-designated manner for further editing by the user.

According to some embodiments in the disclosure, the user may edit the multimedia content in an application. Specifically, in response to receiving other input information in the application, other multimedia content matching the other input information is generated, the other input information indicating a task performed for a first multimedia element in the multimedia content in order to generate a second multimedia element; and the other multimedia content including the second multimedia element is provided in the application. With continued reference to FIG. 7, the user may edit the presentation 740 in the presentation application 720. The user may double click the image 750 (e.g., the first multimedia element) to edit the image. For example, the user may input other input information in the input box 760, for example, "Please convert the image to a grayscale image". At this point, the image 750 in the presentation application 720 may be replaced with a greyscale image (e.g., the second multimedia element). By utilizing the example embodiment in the disclosure, it is convenient for the user to invoke the powerful processing capabilities of the processing system in the current application to perform the desired task.

According to some embodiments in the disclosure, the user may interact with each multimedia element in the application, for example, edit specific content of the multimedia element, and the like. Specifically, in response to receiving an access request for the second multimedia element in the application, another application that corresponds to the file format of the second multimedia element is determined (e.g., determined from the plurality of applications based on the association relationship); and the second multimedia element is presented with the other application.

With continued reference to FIG. 7, assuming the user wishes to edit the image 750, another image editing application may be opened in the browser, and the image is presented. In this manner, the user may be facilitated to further adjust the image in the image editing application. For example, the user may modify the brightness of the image, insert text into the image, and so on. If the user confirms, the image 750 in the presentation application 720 may be replaced with the image confirmed in the image editing application. In this manner, the browser may automatically provide an application for processing the multimedia elements in various file formats, and avoid the user's constant inquiry during use, which application to use to edit multimedia elements, and the complicated operation process of subsequently downloading and installing the corresponding application.

Figure 8:
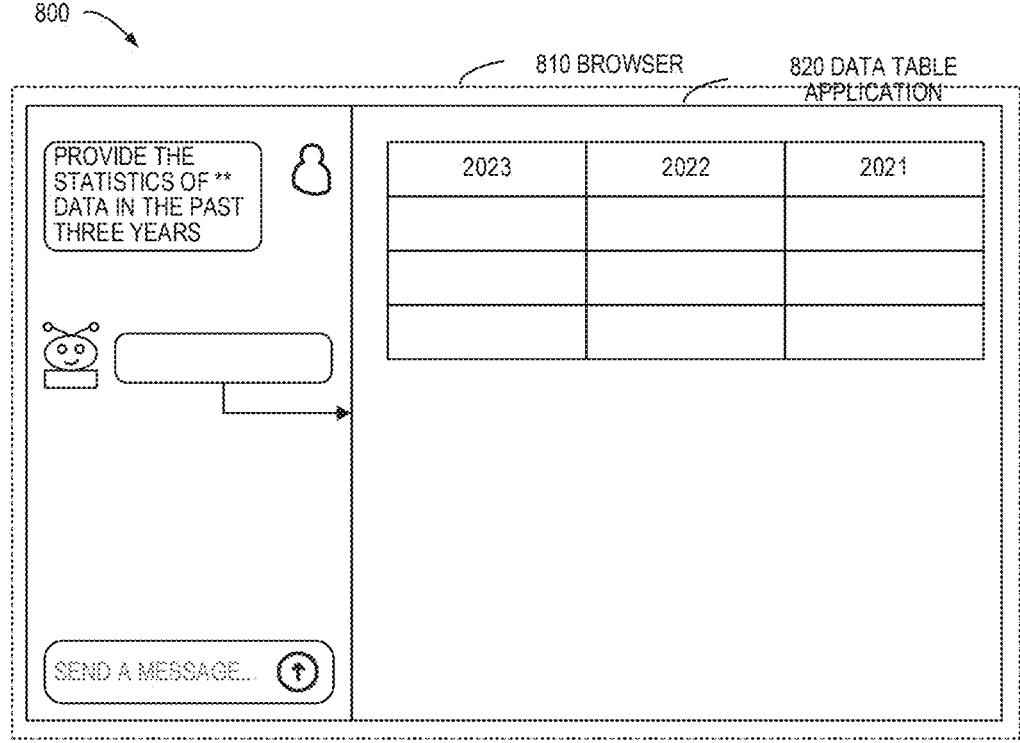
FIG. 8 illustrates a block diagram of presenting multimedia content in a data table application, according to some embodiments in the disclosure.

FIG. 8 illustrates a block diagram 800 of presenting multimedia content in a data table application, in accordance with some embodiments in the disclosure. As shown in FIG. 8, assuming the input information represents "Provide the statistics of  data in the past three years", the processing system may generate a data table, and the data table application 820 may be opened at the browser 810** to present the generated data table. According to some embodiments in the disclosure, login information used to access each application may be stored in the browser, thereby further simplifying the complexity of user operations.

According to example embodiments in the disclosure, a content presentation format may be determined according to information input by a user, and corresponding multimedia content is generated. Further, the multimedia content may be presented in a suitable manner, such that the user may be facilitated to view and/or edit the generated multimedia content. In this manner, the complexity of user's manual operations can be reduced, thereby improving the efficiency of data processing.

Example Processes

FIG. 9 shows a flowchart of a method 900 for presenting multimedia content according to some embodiments in the disclosure. At block 910, determining, in response to the input information of the user, a content presentation format matching the input information. At block 920, generating, based on the input information and the content presentation format, multimedia content, a file format of the multimedia content matching the content presentation format. At block 930, presenting the multimedia content.

According to some embodiments in the disclosure, generating the multimedia content includes generating a set of multimedia elements matching the input information, the multimedia content including the set of multimedia elements, and a layout style of the set of multimedia elements determined based on the input information and the content presentation format.

According to some embodiments in the disclosure, generating the multimedia content includes: providing, to the user, a plurality pieces of prompt information respectively corresponding to a plurality of candidate applications matching the content presentation format; selecting, in response to receiving an interaction request of the user for the prompt information in the plurality pieces of prompt information, a candidate application matching the prompt information from the plurality of candidate applications; and generating the multimedia content based on the at least one file format supported by the candidate application.

According to some embodiments in the disclosure, presenting the multimedia content includes determining an application for presenting the multimedia content; and presenting the multimedia content in the application.

According to some embodiments in the disclosure, determining the application for presenting the multimedia content includes determining the application based on a user input in response to receiving the user input specifying the application.

According to some embodiments in the disclosure, determining the application for presenting the multimedia content includes: determining an association relationship between the file format and a plurality of applications based on a usage history of the plurality of applications by the user; and selecting the application from the plurality of applications based on the association relationship.

According to some embodiments in the disclosure, the usage history indicates the plurality of applications used by the user during processing of the data objects of the plurality of file formats, and determining the association relationship includes: determining, for the file format of the plurality of file formats, an application corresponding to the file format from the plurality of applications based on a frequency of use of the plurality of applications.

According to some embodiments in the disclosure, determining the association relationship further includes: in response to receiving an update request for the association relationship, updating the association relationship based on the update request.

According to some embodiments in the disclosure, determining the application includes: in response to determining that the file format corresponds to a plurality of candidate applications based on the association relationship, determining, from the plurality of candidate applications, the application supported by the client device, the method being performed at the client device.

According to some embodiments in the disclosure, the determining the application includes: in response to determining that the file format corresponds to a plurality of candidate applications based on the association relationship, providing prompt information with respect to the plurality of candidate applications; and in response to receiving a selection request for the prompt information, selecting the application based on the selection request.

According to some embodiments in the disclosure, presenting the multimedia content in the application includes copying the multimedia content to a workspace of the application for presentation of the multimedia content by the application.

According to some embodiments in the disclosure, the multimedia content is determined based on a response of a processing system to the input information, and the method further includes: in response to a failure in determining the application based on the association relationship, determining, by the processing system, a candidate application corresponding to the file format of the multimedia content; and presenting the multimedia content with the candidate application.

According to some embodiments in the disclosure, the plurality of applications are web applications, the method is implemented with a plug-in of a browser for accessing the web application, and the association relationship is stored in the plug-in.

According to some embodiments in the disclosure, the input information is input in the browser and multimedia data is presented in the browser.

According to some embodiments in the disclosure, the method further includes: in response to receiving other input information in the application, generating other multimedia content that matches the other input information, the other input information indicating a task performed for a first multimedia element in the multimedia content in order to generate the second multimedia element; and providing the other multimedia content in the application, the other multimedia content including the second multimedia element.

According to some embodiments in the disclosure, the method further includes: in response to receiving an access request for the second multimedia element in the application, determining another application for the second multimedia element; and presenting the second multimedia element with the other application.

Example Apparatus and Apparatus

FIG. 10 shows a block diagram of an apparatus 1000 for presenting multimedia content according to some embodiments in the disclosure. The device includes a determination module 1010, a generation module 1020 and a presentation module 1030, where the determination module 1010 is configured to determine, in response to input information of a user, a content presentation format matching the input information; the generation module 1020 is configured to generate, based on the input information and the content presentation format, multimedia content, a file format of the multimedia content matching the content presentation format; and the presentation module 1030 is configured to present the multimedia content.

According to some embodiments in the disclosure, the generation module 1020 is further configured to generate a set of multimedia elements matching the input information, the multimedia content including the set of multimedia elements, and a layout style of the set of multimedia elements determined based on the input information and the content presentation format.

According to some embodiments in the disclosure, the generating module 1020 is further configured to: provide, to the user, a plurality pieces of prompt information respectively corresponding to a plurality of candidate applications matching the content presentation format; in response to receiving the interaction request of the user for the prompt information in the plurality of prompt information, select, in response to receiving an interaction request of the user for the prompt information in the plurality pieces of prompt information, a candidate application matching the prompt information from the plurality of candidate applications; and generate the multimedia content based on the at least one file format supported by the candidate application.

According to some embodiments in the disclosure, the presentation module 1030 is further configured to: determine an application for presenting the multimedia content; and present the multimedia content in the application.

According to some embodiments in the disclosure, the presentation module 1030 is further configured to, in response to receiving a user input for specifying the application, determine the application based on the user input.

According to some embodiments in the disclosure, the presenting module 1030 is further configured to: determine an association relationship between the file format and the plurality of applications based on a usage history of the user of the plurality of applications by the user; and select the application from the plurality of applications based on the association relationship.

According to some embodiments in the disclosure, the usage history indicates a plurality of applications used by the user during processing of the data objects of the plurality of file formats, and the presentation module 1030 is further configured to determine, for the file format of the plurality of file formats, an application corresponding to the file format from the plurality of applications based on a frequency of use of the plurality of applications.

According to some embodiments in the disclosure, the presenting module 1030 is further configured to: in response to receiving an update request for the association relationship, update the association relationship based on the update request.

According to some embodiments in the disclosure, the presenting module 1030 is further configured to determine, in response to determining that the file format corresponds to a plurality of candidate applications based on the association relationship, the application supported by the client device from the plurality of candidate applications, the method performed at the client device.

According to some embodiments in the disclosure, the presenting module 1030 is further configured to: in response to determining that the file format corresponds to a plurality of candidate applications based on the association relationship, provide prompt information with respect to the plurality of candidate applications; and in response to receiving a selection request for the prompt information, select the application based on the selection request.

According to some embodiments in the disclosure, the presentation module 1030 is further configured to copy the multimedia content to a workspace of the application for presentation of the multimedia content by the application.

According to some embodiments in the disclosure, the multimedia content is determined based on a response of a processing system to the input information, and the presenting module 1030 is further configured to: in response to a failure in determining the application based on the association relationship, determine, by the processing system, a candidate application corresponding to the file format of the multimedia content; and present the multimedia content with the candidate application.

According to some embodiments in the disclosure, the plurality of applications are web applications, the device 1000 is implemented with a plug-in of a browser for accessing the web application, and the association relationship is stored in the plug-in.

According to some embodiments in the disclosure, input information is input in the browser and multimedia data is presented in the browser.

According to some embodiments in the disclosure, the apparatus 1000 is further configured to: in response to receiving other input information in an application, generate other multimedia content that matches the other input information, the other input information indicating a task performed for a first multimedia element in the multimedia content in order to generate a second multimedia element; and provide the other multimedia content in the application, the other multimedia content including the second multimedia element.

According to some embodiments in the disclosure, the apparatus 1000 is further configured to: in response to receiving an access request for the second multimedia element in the application, determine another application for the second multimedia element; and present the second multimedia element with the other application.

Figure 11:
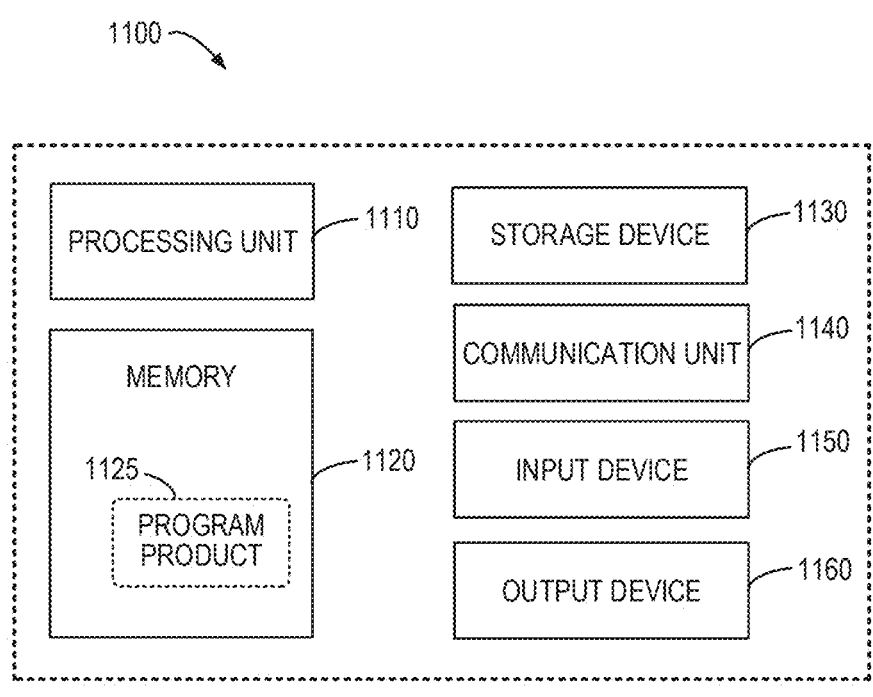
FIG. 11 illustrates a block diagram of a device capable of implementing various embodiments in the disclosure.

FIG. 11 illustrates a block diagram of a device 1100 capable of implementing various embodiments in the disclosure. It should be understood that the computing device 1100 shown in FIG. 11 is merely example and should not constitute any limitation on the functionality and scope of the embodiments described herein. The computing device 1100 shown in FIG. 11 may be configured to implement the method described above.

As shown in FIG. 11, the computing device 1100 is in the form of a general-purpose computing device. Components of the computing device 1100 may include, but are not limited to, one or more processors or processing units 1110, a memory 1120, a storage device 1130, one or more communication units 1140, one or more input devices 1150, and one or more output devices 1160. The processing unit 1110 may be an actual or virtual processor and capable of performing various processes according to programs stored in the memory 1120. In multiprocessor systems, multiple processing units execute computer-executable instructions in parallel to improve parallel processing capabilities of computing device 1100.

Computing device 1100 typically includes a plurality of computer storage media. Such media may be any available media accessible by the computing device 1100, including, but not limited to, volatile and non-volatile media, removable and non-removable media. The memory 1120 may be volatile memory (e.g., registers, caches, random access memory (RAM)), non-volatile memory (e.g., read-only memory (ROM), electrically erasable programmable read-only memory (EEPROM), flash memory), or some combination thereof. Storage device 1130 may be a removable or non-removable medium and may include a machine-readable medium, such as a flash drive, magnetic disk, or any other medium, which may be capable of storing information and/or data (e.g., training data for training) and may be accessed within computing device 1100.

The computing device 1100 may further include additional removable/non-removable, volatile/non-volatile storage media. Although not shown in FIG. 11, a disk drive for reading or writing from a removable, nonvolatile magnetic disk (e.g., a "floppy disk") and an optical disk drive for reading or writing from a removable, nonvolatile optical disk may be provided. In these cases, each drive may be connected to a bus (not shown) by one or more data media interfaces. The memory 1120 may include a computer program product 1125 having one or more program modules configured to perform various methods or actions of various embodiments in the disclosure.

The communications unit 1140 implements communications with other computing devices over a communications medium. Additionally, the functionality of components of the computing device 1100 may be implemented in a single computing cluster or multiple computing machines capable of communicating over a communication connection. Thus, the computing device 1100 may operate in a networked environment using logical connections with one or more other servers, network personal computers (PCs), or another network node.

The input device 1150 may be one or more input devices, such as a mouse, a keyboard, a trackball, or the like. The output device 1160 may be one or more output devices, such as a display, a speaker, a printer, or the like. Computing device 1100 may also communicate with one or more external devices (not shown) as needed, external devices such as storage devices, display devices, etc., communicate with one or more devices that enable a user to interact with computing device 1100, or communicate with any device (e.g., network card, modem, etc.) that enables computing device 1100 to communicate with one or more other computing devices. Such communication may be performed via an input/output (110) interface (not shown).

According to example embodiments in the disclosure, there is provided a computer-readable storage medium having computer-executable instructions stored thereon, where the computer-executable instructions are executed by a processor to implement the method described above. According to example embodiments in the disclosure, a computer program product is further provided, the computer program product being tangibly stored on a non-transitory computer-readable medium and including computer-executable instructions, the computer-executable instructions being executed by a processor to implement the method described above. According to example embodiments in the disclosure, there is provided a computer program product having stored thereon a computer program, which when executed by a processor, implements the method described above.

Aspects in the disclosure are described herein with reference to flowcharts and/or block diagrams of methods, apparatuses, devices, and computer program products implemented in accordance with the disclosure. It should be understood that each block of the flowchart and/or block diagram, and combinations of blocks in the flowcharts and/or block diagrams, may be implemented by computer readable program instructions.

These computer-readable program instructions may be provided to a processing unit of a general purpose computer, special purpose computer, or other programmable data processing apparatus to produce a machine, such that the instructions, when executed by a processing unit of a computer or other programmable data processing apparatus, produce means to implement the functions/acts specified in the flowchart and/or block diagram. These computer-readable program instructions may also be stored in a computer-readable storage medium that cause the computer, programmable data processing apparatus, and/or other devices to function in a particular manner, such that the computer-readable medium storing instructions includes an article of manufacture including instructions to implement aspects of the functions/acts specified in the flowchart and/or block diagram (s).

The computer-readable program instructions may be loaded onto a computer, other programmable data processing apparatus, or other apparatus, such that a series of operational steps are performed on a computer, other programmable data processing apparatus, or other apparatus to produce a computer-implemented process such that the instructions executed on a computer, other programmable data processing apparatus, or other apparatus implement the functions/acts specified in the flowchart and/or block diagram block or blocks.

The flowchart and block diagrams in the figures show architecture, functionality, and operation of possible embodiments of systems, methods, and computer program products according to various embodiments in the disclosure. In this regard, each block in the flowchart or block diagram may represent a module, program segment, or portion of an instruction that includes one or more executable instructions for implementing the specified logical function. In some alternative embodiments, the functions noted in the blocks may also occur in a different order than noted in the figures. For example, two consecutive blocks may actually be performed substantially in parallel, which may sometimes be performed in the reverse order, depending on the functionality involved. It is also noted that each block in the block diagrams and/or flowchart, as well as combinations of blocks in the block diagrams and/or flowchart, may be implemented with a dedicated hardware-based system that performs the specified functions or actions, or may be implemented in a combination of dedicated hardware and computer instructions.

Various embodiments in the disclosure have been described above, which are exemplary, not exhaustive, and are not limited to the embodiments disclosed. Many modifications and variations will be apparent to those of ordinary skill in the art without departing from the scope and spirit of the various embodiments illustrated. The selection of the terms used herein is intended to best explain the principles of the embodiments, practical applications, or improvements to techniques in the marketplace, or to enable others of ordinary skill in the art to understand the various embodiments disclosed herein.

The invention claimed is:

1. A method for presenting multimedia content comprising:

receiving, by a processing system, input information from a user;

determining, by the processing system, in response to the input information from the user, a content presentation format matching the input information by analyzing the input information to identify a context and selecting a format from a predefined set of formats based on the context;

generating, by the processing system, based on the input information and the content presentation format, multimedia content by invoking a content generation model configured to produce the multimedia content, wherein the multimedia content is generated in a file format corresponding to a native editable content structure supported by an application, the file format of the multimedia content matching the content presentation format; and presenting, by the processing system, the multimedia content in an application interface of the application by inserting the multimedia content as an application-editable content object into an editable region in the application interface corresponding to the file format, wherein the inserted multimedia content is editable by the application.

2. The method of claim 1, wherein generating the multimedia content comprises: generating, by the processing system, a set of multimedia elements matching the input information, the multimedia content comprising the set of multimedia elements, and a layout style of the set of multimedia elements determined based on the input information and the content presentation format.

3. The method of claim 1, wherein generating the multimedia content comprises:

providing, by the processing system, to the user, a plurality pieces of prompt information respectively corresponding to a plurality of candidate applications matching the content presentation format;

selecting, by the processing system, in response to receiving an interaction request of the user for the prompt information in the plurality pieces of prompt information, a candidate application matching the prompt information from the plurality of candidate applications; and generating, by the processing system, the multimedia content based on at least one file format supported by the candidate application.

4. The method of claim 1, wherein presenting the multimedia content comprises:

determining, by the processing system, the application for presenting the multimedia content; and presenting, by the processing system, the multimedia content in the application interface of the application.

5. The method of claim 4, wherein determining the application for presenting the multimedia content comprises: in response to receiving a user input specifying the application, determining the application based on the user input by the processing system.

6. The method of claim 4, wherein determining the application for presenting the multimedia content comprises:

determining, by the processing system, an association relationship between the file format and a plurality of applications based on a usage history of the plurality of applications by the user; and selecting, by the processing system, the application from the plurality of applications based on the association relationship.

7. The method of claim 6, wherein the usage history indicates the plurality of applications used by the user during processing of data objects of a plurality of file formats, and determining the association relationship comprises: determining, by the processing system, for the file format of the plurality of file formats, an application corresponding to the file format from the plurality of applications based on a frequency of use of the plurality of applications.

8. The method of claim 6, wherein determining the association relationship further comprises: in response to receiving an update request for the association relationship, updating, by the processing system, the association relationship based on the update request.

9. The method of claim 6, wherein determining the application comprises: in response to determining that the file format corresponds to a plurality of candidate applications based on the association relationship, determining, by the processing system, from the plurality of candidate applications, the application supported by a client device, the method performed at the client device.

10. The method of claim 6, wherein determining the application comprises:

in response to determining that the file format corresponds to a plurality of candidate applications based on the association relationship, providing, by the processing system, prompt information with respect to the plurality of candidate applications; and in response to receiving a selection request for the prompt information, selecting, by the processing system, the application based on the selection request.

11. The method of claim 4, wherein presenting the multimedia content in the application comprises: copying, by the processing system, the multimedia content to a workspace of the application for presentation of the multimedia content by the application.

12. The method of claim 6, wherein the multimedia content is determined based on a response of the processing system for the input information, and the method further comprises:

in response to a failure in determining the application based on the association relationship, determining, by the processing system, a candidate application corresponding to the file format of the multimedia content; and presenting the multimedia content with the candidate application.

13. The method of claim 6, wherein the plurality of applications are web applications, the method is implemented with a plug-in of a browser for accessing the web application, and the association relationship is stored in the plug-in.

14. The method of claim 13, wherein the input information is input in the browser and the multimedia content is presented in the browser.

15. The method of claim 4, further comprising:

generating, by the processing system, in response to receiving other input information in the application, other multimedia content that matches the other input information, the other input information indicating a task performed for a first multimedia element in the multimedia content in order to generate a second multimedia element; and providing, by the processing system, the other multimedia content in the application, the other multimedia content comprising the second multimedia element.

16. The method of claim 15, further comprising:

in response to receiving an access request for the second multimedia element in the application, determining, by the processing system, another application for the second multimedia element; and presenting, by the processing system, the second multimedia element with the other application.

17. An electronic device, comprising:

at least one processing unit; and at least one memory coupled to the at least one processing unit and storing instructions for execution by the at least one processing unit, the instructions, when executed by the at least one processing unit, causing the electronic device to perform operations for presenting multimedia content comprising:

receiving input information from a user;

determining, in response to the input information from the user, a content presentation format matching the input information by analyzing the input information to identify a context and selecting a format from a predefined set of formats based on the context;

generating, based on the input information and the content presentation format, multimedia content by invoking a content generation model configured to produce the multimedia content, wherein the multimedia content is generated in a file format corresponding to a native editable content structure supported by an application, the file format of the multimedia content matching the content presentation format; and presenting the multimedia content in an application interface of the application by inserting the multimedia content as an application-editable content object into an editable region in the application interface corresponding to the file format, wherein the inserted multimedia content is editable by the application.

18. The electronic device of claim 17, wherein generating the multimedia content comprises: generating a set of multimedia elements matching the input information, the multimedia content comprising the set of multimedia elements, and a layout style of the set of multimedia elements determined based on the input information and the content presentation format.

19. The electronic device of claim 17, wherein generating the multimedia content comprises:

providing, to the user, a plurality pieces of prompt information respectively corresponding to a plurality of candidate applications matching the content presentation format;

selecting, in response to receiving an interaction request of the user for the prompt information in the plurality pieces of prompt information, a candidate application matching the prompt information from the plurality of candidate applications; and generating the multimedia content based on at least one file format supported by the candidate application.

20. A non-transitory computer-readable storage medium having stored thereon a computer program which, when executed by a processor, causes the processor to perform operations for presenting multimedia content comprising:

receiving input information from a user;

determining, in response to the input information from the user, a content presentation format matching the input information by analyzing the input information to identify a context and selecting a format from a predefined set of formats based on the context;

generating, based on the input information and the content presentation format, multimedia content by invoking a content generation model configured to produce the multimedia content, wherein the multimedia content is generated in a file format corresponding to a native editable content structure supported by an application, the file format of the multimedia content matching the content presentation format; and presenting the multimedia content in an application interface of the application by inserting the multimedia content as an application-editable content object into an editable region in the application interface corresponding to the file format, wherein the inserted multimedia content is editable by the application.

* * * * *